(12) United States Patent
Osborne et al.

(10) Patent No.: US 7,503,784 B2
(45) Date of Patent: Mar. 17, 2009

(54) QUICK CONNECTOR

(75) Inventors: James Ryan Osborne, Davisburg, MI (US); Giuseppe Antonio Gattozzi, LaSalle (CA)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 11/683,250

(22) Filed: Mar. 7, 2007

(65) Prior Publication Data

US 2007/0212912 A1 Sep. 13, 2007

Related U.S. Application Data

(60) Provisional application No. 60/780,141, filed on Mar. 8, 2006.

(51) Int. Cl.
*H01R 13/62* (2006.01)

(52) U.S. Cl. ........................................ 439/180; 285/305

(58) Field of Classification Search ................. 439/180, 439/413, 598, 578, 320; 285/305, 308, 315
See application file for complete search history.

(56) References Cited

U.S. PATENT DOCUMENTS

| | | | | |
|---|---|---|---|---|
| 2,881,479 A | * | 4/1959 | Quackenbush | 264/261 |
| 3,337,664 A | * | 8/1967 | Lyon | 264/547 |
| 3,851,666 A | * | 12/1974 | Hammond | 137/614.04 |
| 5,161,832 A | | 11/1992 | McNaughton et al. | |
| 5,324,082 A | | 6/1994 | McNaughton et al. | |
| 5,380,279 A | * | 1/1995 | Schmidt | 604/46 |
| 5,423,577 A | | 6/1995 | Ketcham | |
| 5,586,792 A | | 12/1996 | Kalahasthy et al. | |
| 5,614,091 A | * | 3/1997 | Janik et al. | 210/249 |
| 5,626,371 A | | 5/1997 | Bartholomew | |
| 5,628,531 A | | 5/1997 | Rosenberg et al. | |
| 5,863,077 A | | 1/1999 | Szabo et al. | |
| 6,846,021 B2 | | 1/2005 | Rhode et al. | |
| 2005/0166681 A1 | * | 8/2005 | Onoda et al. | 73/715 |
| 2005/0218650 A1 | * | 10/2005 | Pepe et al. | 285/308 |
| 2006/0103134 A1 | | 5/2006 | Kerin | |

FOREIGN PATENT DOCUMENTS

| | | |
|---|---|---|
| DE | 101 08 199 A1 | 8/2002 |
| DE | 101 17 731 C1 | 1/2003 |
| WO | WO 02/075193 A1 | 9/2002 |

* cited by examiner

*Primary Examiner*—Jean F Duverne
(74) *Attorney, Agent, or Firm*—Leydig, Voit & Mayer, Ltd (57) ABSTRACT

A quick connector with an accessory housing. The accessory housing receives a system sensing device such as an absolute pressure sensor or a differential pressure sensor in fluid tight relation to the housing. A receptacle portion is arranged to connector the sensor to measuring instrumentation.

22 Claims, 7 Drawing Sheets

QUICK CONNECTOR

This application claims priority pursuant to 35 USC § 119 to provisional application 60/780,141 filed Mar. 8, 2006.

BACKGROUND OF THE INVENTION

This invention relates to fluid system quick connectors to connect a rigid tube to a flexible hose or other system component. More particularly, it relates to a quick connector that includes a mechanism for sensing conditions within the system.

Quick connectors are commonly used to provide a permanent but severable connection between a rigid tube and a flexible hose or other component. Such connections are illustrated in U.S. Pat. Nos. 5,161,832; 5,324,082; 5,423,577; 5,586,792; 5,626,371; 5,628,531; 5,863,077; 6,846,021 and U.S. Publication No. 2005/0218650, each of the subject matters of which are hereby incorporated by reference herein.

Such quick connectors have wide application, but are particularly useful in vehicular fuel systems. Many such connectors are employed in the liquid and/or vapor lines that comprise the fuel system of modern automobile vehicles.

Evolution of modern day engine operation diagnostics and control has presented the need for monitoring operating conditions within the fuel system. Parameters such as fuel or vapor pressure, vacuum, temperature and the like must be sensed to provide inputs necessary to the diagnostic or control function. Introduction of separate sensing elements has multiplied the number of components within a given system and has added to the number of connections or possible leakage paths within a system. Alternatively, addition of sensing elements to components such as the fuel tank flange has complicated design requirements and increased cost.

The present invention provides a quick connector device that permits incorporation of system sensing elements into the connector body. The connector body includes an integrally formed housing defining a cavity or chamber with a removable cover for installation of a variety of mechanisms particularly sensing mechanisms. Within the scope of the invention the housing cavity can contain a wide variety of devices which may or may not be sensing mechanisms.

The connector body defines a portion of the fluid path within the system. A path in the body provides fluid communication from the fluid system to the chamber.

In the embodiments disclosed, a sensor within the housing, integral to the connector body, measures a value of the parameter being sensed and provides a signal indicative of the value. A receptacle receives an electrical plug that connects the sensor to signal receiving and processing circuitry.

DETAILED DESCRIPTION

Turning to FIGS. 1-5, there is illustrated a connector body of a quick connector coupling illustrative of the present invention. For purposes of illustrating the principles of the invention, a connector body such as that disclosed in U.S. Pat. No. 5,586,792 is illustrated. The content of U.S. Pat. No. 5,586,792 is hereby incorporated by reference herein.

The disclosure of U.S. Pat. No. 5,586,792 describes the connector and fluid system components including the rigid tube and flexible hose. The following description describes the additions and modifications to the quick connector body of U.S. Pat. No. 5,586,792 that embody the present invention. The invention, however, is suitable for incorporation into any of the quick connectors previously identified, as well as numerous other quick connector configurations known in the art.

Figure 1:
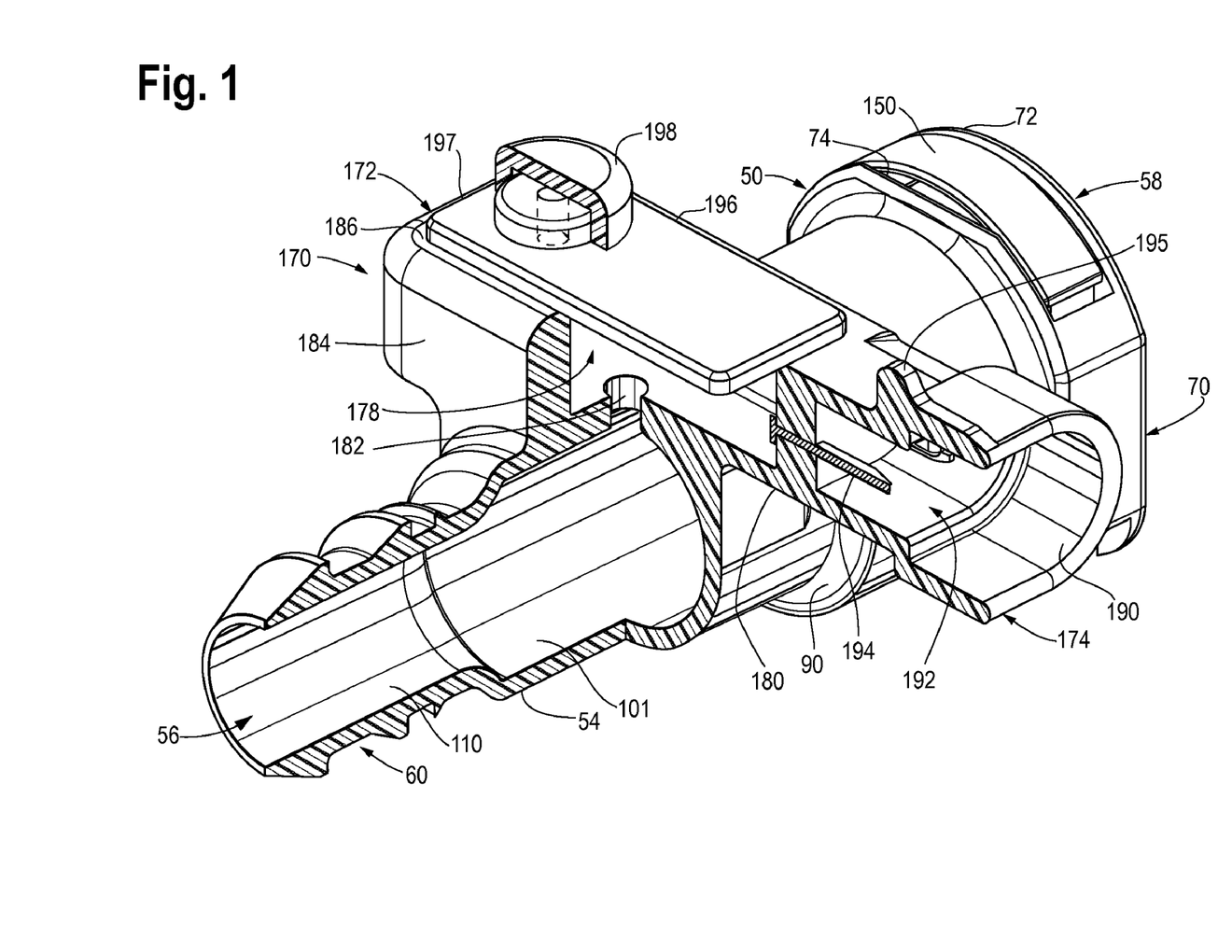
FIG. 1 is a partially cut-away perspective view of a quick connector body illustrating the principles of the present invention.

FIG. 1 illustrates a connector body 50 embodying the present invention. It is a generally cylindrical elongate structure molded of a polymeric material such as nylon-12. It includes a wall 54 defining a through bore 56 that extends from a large diameter male member reception end 58 to a barbed stem or hose connection end 60. The barbs coast with an attached flexible hose in a well-known manner to relasably retain a flexible hose on end 60.

The stem end illustrated is suitable for attachment of a flexible hose to the body 50 of the connector. Numerous other end configurations are useful, depending on the components employed in the fluid system. For example, the end 60 could be configured to be secured to the non-flexible line or a rigid line with, or without an O-ring seal employed between the end 60 and the attached line. The connection could be secured in a variety of ways, such as by crimping, magna-forming or the like.

Variations in the diameter of the interior bore 56 divide the bore into a fluid passageway portion 110, a tube end receptacle 101 and a seal receiving portion 90. Fluid passageway portion 110 communicates with the attached hose. Tube end receptacle portion 101 positions the end of the inserted tube. Seal receiving portion 90 houses one or more O-ring seals to provide a fluid tight relationship with the inserted rigid tube.

The body further defines a retainer housing section 70 adjacent male member reception end 58. It includes outer annular rim 72 and inner annular rim 74 connected by support members. A generally "U" shaped retainer 150 resides between the rims 72 and 74 and coasts with the male member in a well-known manner to relasably retain a male member within the connector body with the upset on the tube captured against removal by the retainer.

In accordance with the present invention the connector body 50 is provided with an accessory housing generally designated 170 integrally molded to connector body 50. It includes an accessory cavity defining portion 172 and a receptacle portion 174. It is disposed generally transverse to the longitudinal axis of the through bore 56 defined by wall 54 of body 50. However, the housing 170 could be oriented in any desired relation relative to the length of bore 56.

Figures 2, 3:
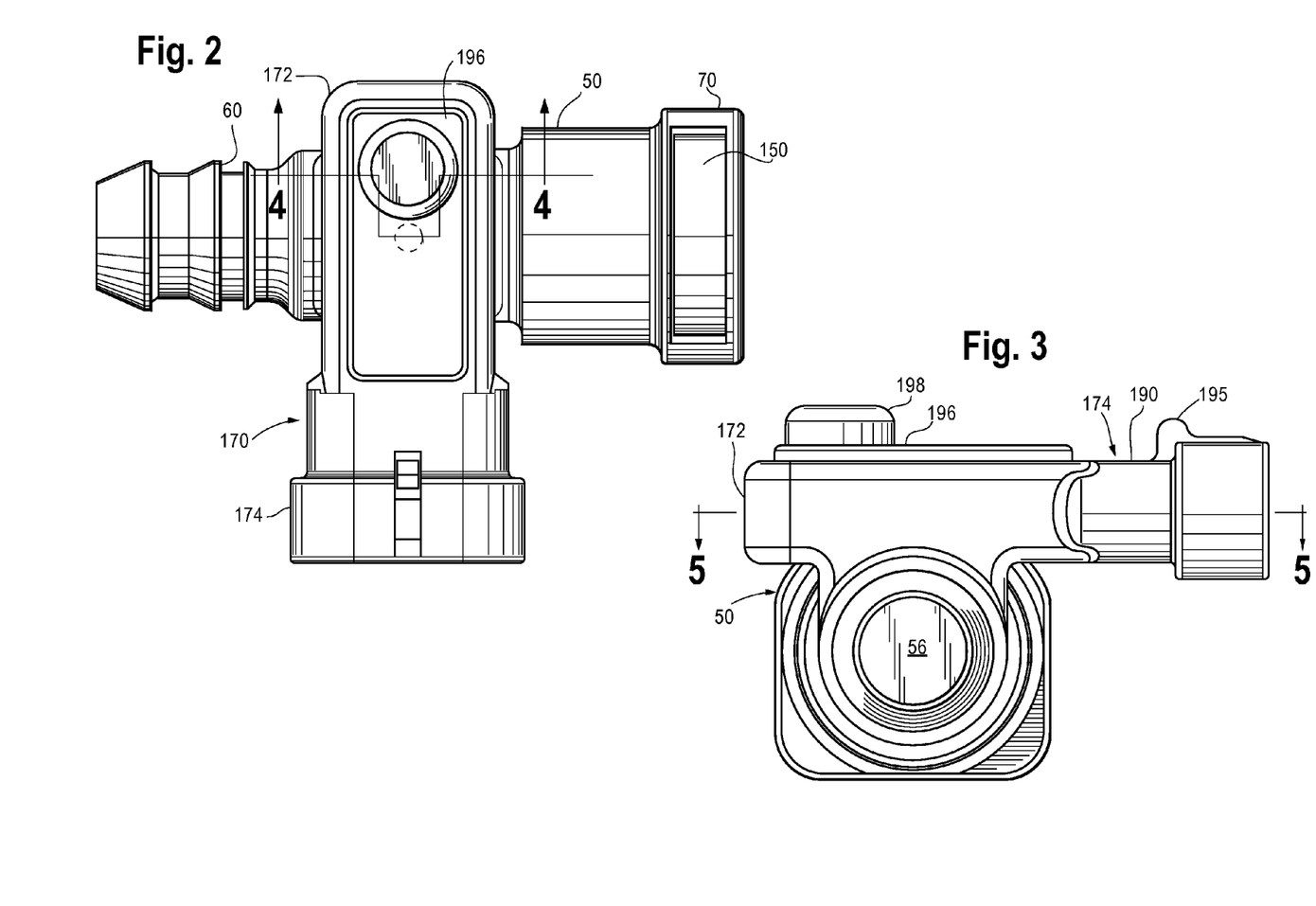
FIG. 2 is a top view of the quick connector body of FIG. 1.
FIG. 3 is an end view of the quick connector body of FIG. 1.
Figure 5:
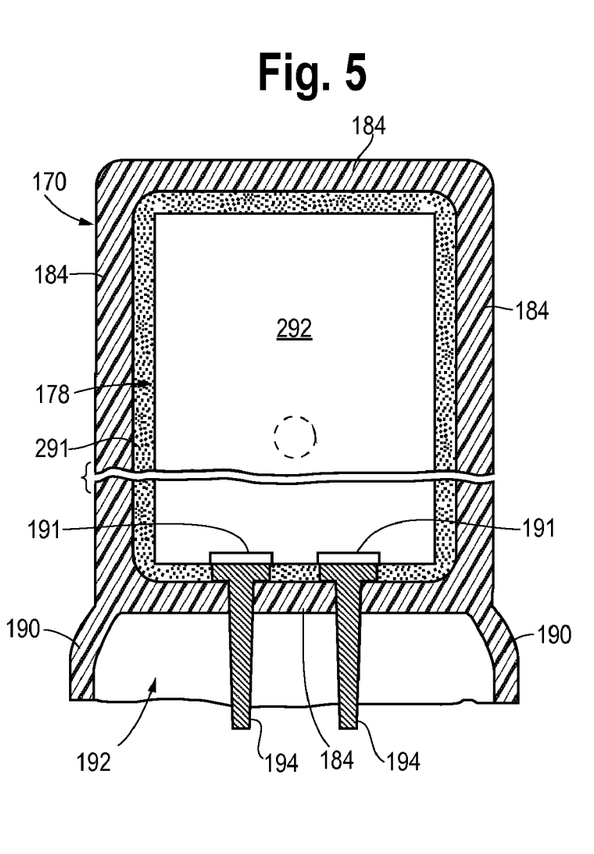
FIG. 5 is a fragmentary sectional view taken along the line 5-5 of FIG. 3 of a quick connector having a connector body of FIG. 1-3 with a sensing device installed in the accessory chamber.

The cavity defining portion 172 defines an accessory chamber 178 to receive a sensor or other device 292 discussed in greater detail below. Cavity defining portion includes a bottom wall 180 partially coextensive with the wall 54 of connector body 50 as best seen in FIGS. 2 and 5. Bottom wall 180 includes a bore or passageway 182 in communication with through bore 56. The chamber 178 is thus in fluid communication with the fluid within the system that includes the quick connector coupling.

Sidewalls 184 extend from bottom wall 180 in a direction away from connector body 50 and define an entrance with a surrounding rim 186.

Receptacle portion 174 of housing 170 includes wall 190 extending from one of the sidewalls 184 of cavity defining portion 172 of housing 170. Wall 190 defines a hollow plug receiving chamber 192.

Electrically conductive prongs or blades 194 are imbedded in the sidewall 184 in fluid tight relation and extend into chamber 178. The ends of the prongs 194 are exposed within chamber 178 and include contacts for contact with the circuitry of a sensor or other device 292.

A lug 195 is provided on the exterior of wall 190. It is configured to coast with an insertable plug (not shown) associated with sensor monitoring and data processing devices. The lug 195 relasably retains the plug within hollow plug receiving chamber 192. Suitable contacts within the plug complete the circuit to device 292 through contact with prongs 194.

A cover 196 is relasably positioned on rim 186. Cover 196 is connected in fluid tight relation to rim 186. It is removable for installation of a device 292 within chamber 178 of housing 170.

Figure 4:
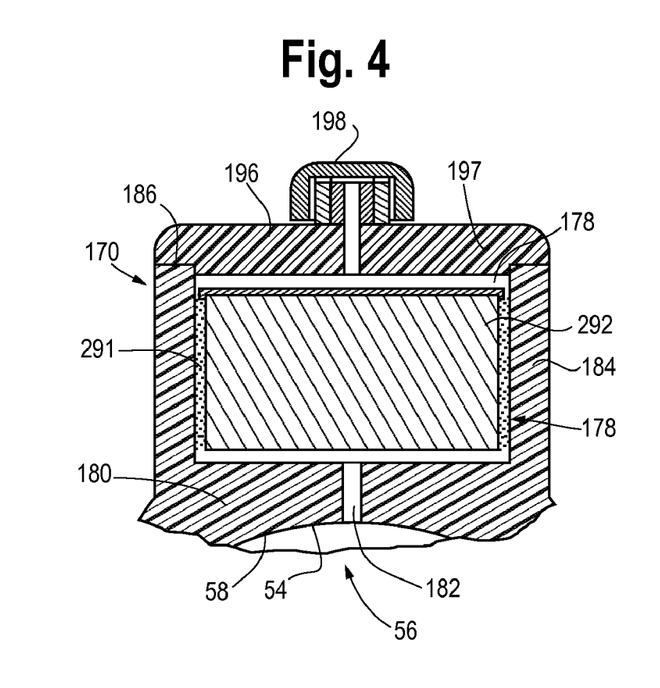
FIG. 4 is a fragmentary sectional view taken along the line 4-4 of FIG. 2 of a quick connector having the connector body of FIGS. 1-3 with a sensing device installed in the accessory chamber.

As best seen in FIG. 4, cover 196 includes a port 197 that communicates between the surrounding atmosphere and the interior of cavity or chamber 178. It is situated under a protective cap 198. This port or passageway provides access to a reference source of surrounding ambient atmosphere. A sensor 292 can provide a comparative signal based on the difference between the condition sensed in the fluid system and the corresponding parameter in the surrounding atmosphere. The port 197 is isolated from the port or passageway 182 by device 292 which is disposed in the cavity 178 in fluid tight relation to the side walls 184 thus retaining the fluid tight integrity of the fluid of the fluid system within through bore 56 of body 50.

Figure 12:
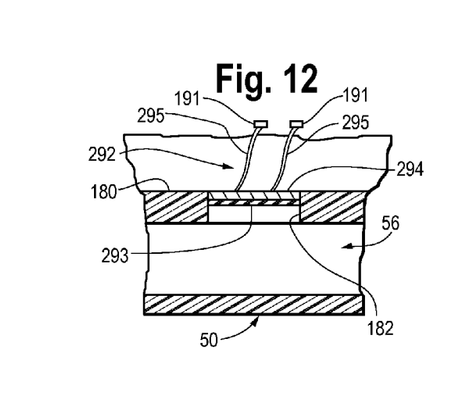
FIG. 12 is a schematic representation of a strain gauge sensor device usable in connection with the present invention.

A device 292 such as the strain gauge illustrated schematically in FIG. 12 is insertable into the accessory chamber 178 of accessory housing 170 of the embodiment of FIGS. 1 to 5. It is disposed in the cavity or chamber 178. To ensure the fluid tight integrity of the fluid system that incorporates the quick connector, the device 292 is sealed in a leak-proof relationship to sidewalls 184 of chamber 128 with an appropriate sealant or potting material 291. In this manner, no path exists between the port or passageway 182 that communicates with the fluid system in the connector through bore 56 and the port 197 in the cover 196 that is exposed to the atmosphere.

The potting material 291 best seen in FIGS. 4 and 5 may be an epoxy such as cured liquid polysulfide that provides excellent insulating, sealing, reinforcement and corrosion protection for the electrical connectors within the chamber 178. It is also resistant to hydrocarbon fuels. It is a pourable material that will flow about the sensor 292 and connectors. It is also suitable for establishing a sealing connection between cover 196 and side walls 184 at rim 186 to ensure the fluid tight integrity of the chamber 178.

Referring to FIG. 12, the strain gauge pressure sensor is illustrated in position to sense pressure within fluid passage or bore 56 of the connector body 50. It includes diaphragm 293, exposed to fluid pressure in the passageway 182 in bottom wall 180, and a metal foil 294 adjacent to the diaphragm 293. The foil senses the strain caused by deflection of the diaphragm 293. Electrical leads 295 are connected to the contacts 191 which contact prongs 194 and transfer an electrical signal to a measuring instrument (not shown) that converts the sensed signal to a pressure reading.

It should be noted that since the sensor 292 is bonded to side wails 184 in the accessory cavity or chamber 178 it is not necessary to utilize cover 196 in all applications. The sensing device 292 may include leads 295 that extend from the top of the device and pass outward of the chamber 178 through the opening defined by rim 186.

The device 292 may be any sensor suitable for the sensing function to be performed. It could be a temperature sensing transducer, a pressure or vacuum sensing transducer, or a thermost which senses both temperature and pressure. The sensor could, for example, monitor oxygen content or hydrocarbon content of vapor within the fluid system.

A quick connector with a body having an accessory housing with an accessory chamber such as chamber 178 could be utilized for any number of system devices, not necessarily sensors that recognize and report system conditions. These include leak detection devices, vapor shut-off devices, variable orifice or flow control devices, vapor purge devices, flow diversion devices, pulse dampeners, regulators, drains, manual shut off devices, bleed off ports and the like.

Turning to FIGS. 6-11, there is illustrated a connector body illustrative of the present invention. The connector body includes two portions positioned at ninety degrees (90°) to each other, as illustrated in U.S. Pat. Nos. 5,423,577 or 5,628,531, the disclosures of which are incorporated by reference herein. The fluid system components including the rigid tube and flexible hose connected by the illustrated connector body are configured as previously described and are well known in the art.

Figures 6, 7:
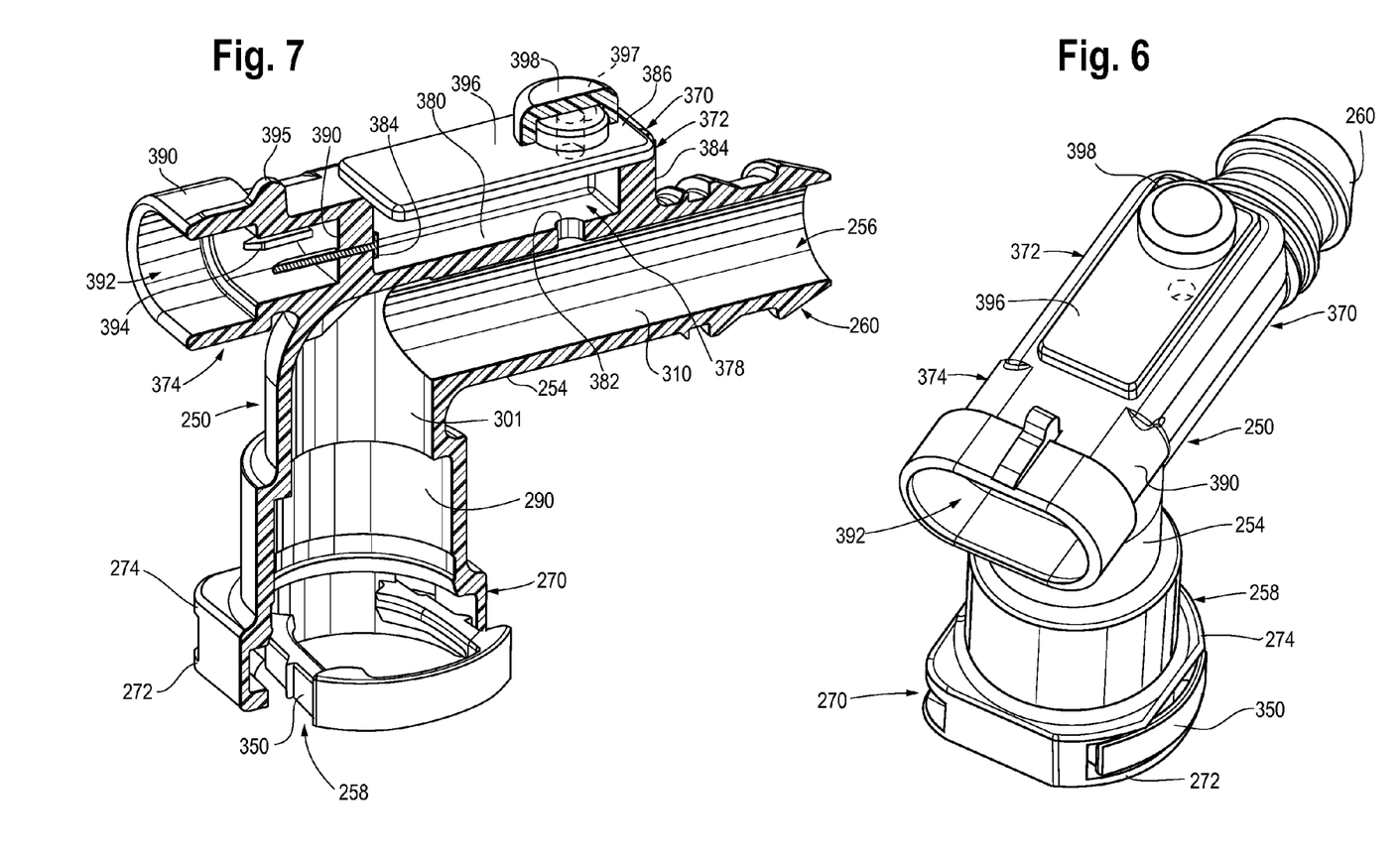
FIG. 6 is a perspective view of a slightly different form of quick connector body illustrating the features of the present invention.
FIG. 7 is a partially cut-away perspective view of the quick connector body of FIG. 6.
Figure 8:
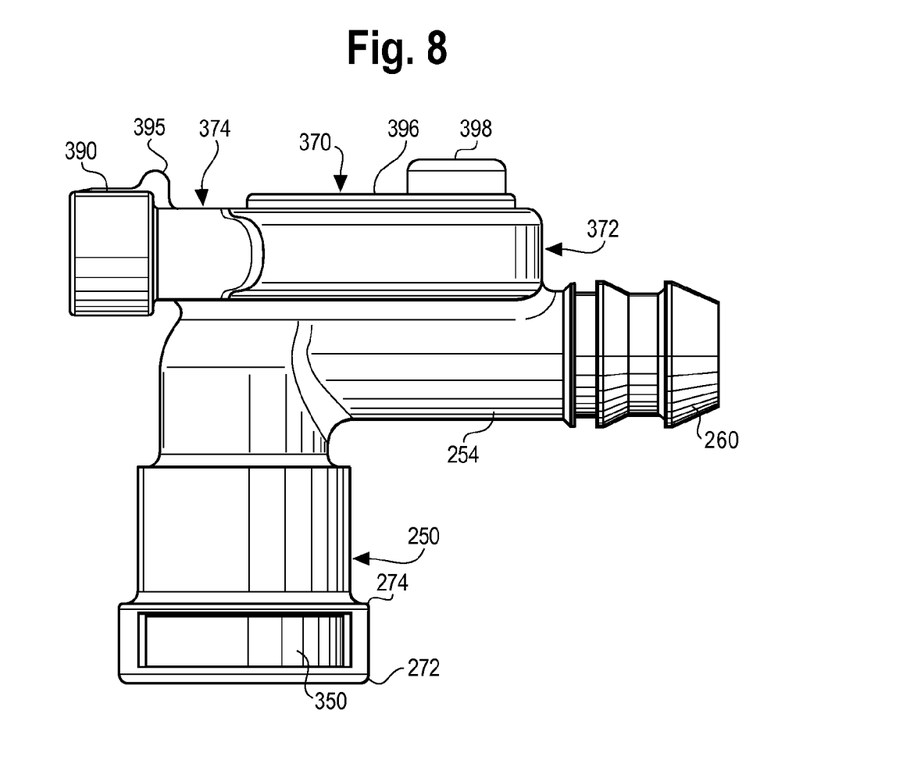
FIG. 8 is a side view of the quick connector body of FIG. 6.
Figure 9:
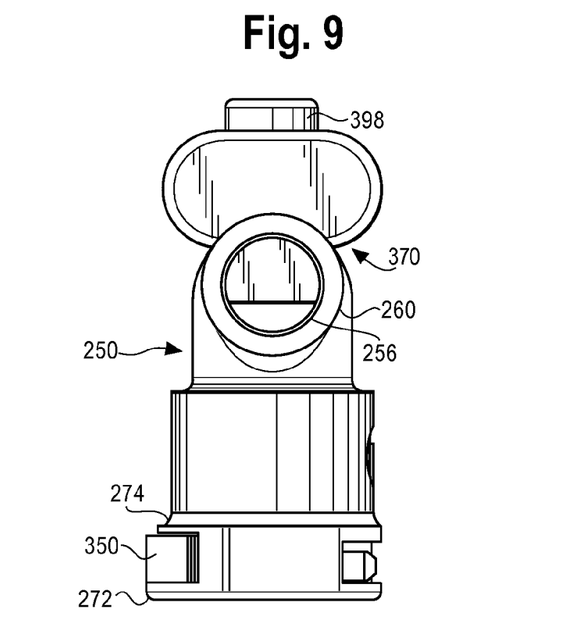
FIG. 9 is an end view of the quick connector body of FIG. 6.
Figure 10:
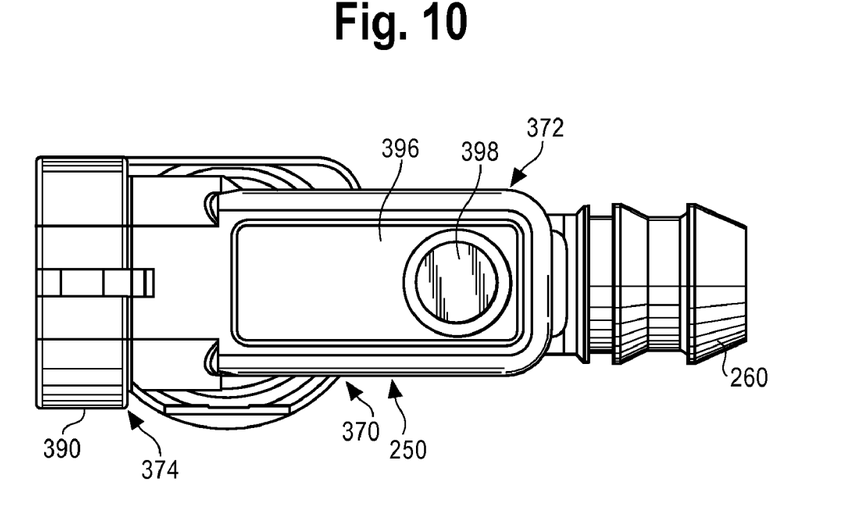
FIG. 10 is a top view of the quick connector body of FIG. 6.
Figure 11:
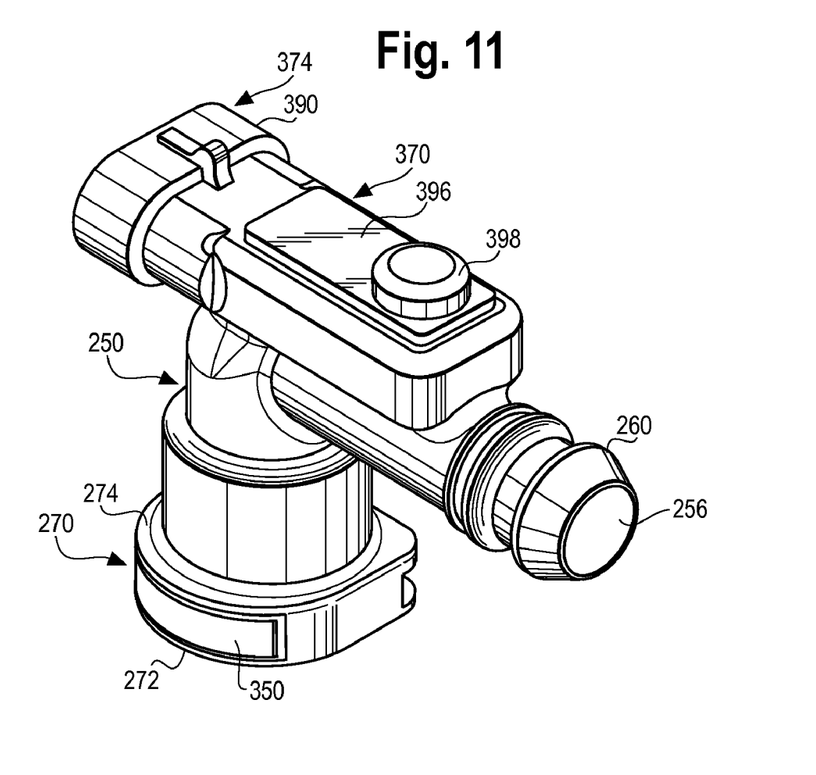
FIG. 11 is a further perspective view on a different scale of the quick connector body of FIG. 6.

FIGS. 6 and 7 illustrate a connector body 250 embodying the present invention. It is a generally cylindrical elongate structure molded of a polymeric material such as nylon-12. It includes a wall 254 defining a through bore 256 that extends from a large diameter male member reception end 258 to a barbed stem or hose connection end 260. The barbs coast with an attached flexible hose in a well-known manner to relasably retain a flexible hose on end 260.

The stem end illustrated is suitable for attachment of a flexible hose to the body 250 of the connector. Numerous other end configurations are useful, depending on the components employed in the fluid system. For example, the end 260 could be configured to be secured to the non-flexible line or a rigid line with, or without an O-ring seal employed between the end 260 and the attached line. The connection could be secured in a variety of ways, such as by crimping, magna-forming or the like.

The main difference between this embodiment, and that of FIGS. 1 to 5 is that the connector body 250 has an "elbow" shape. That is, the male member reception end 258 and the stem portion 260 are disposed at ninety degrees (90°) to each other and the through bore 256 defines a fluid path that includes a 90° bend. Quick connectors of this shape have wide application in locations where space is limited and the rigid tube and flexible hose paths can be positioned at an angle to each other. It should be understood that the angle is not limited to 90°. Any suitable angular relationship between the male member reception end 258 and the stem end or hose connector end 260 may be employed.

Variations in the diameter of the interior bore 256 divide the bore into a fluid passageway portion 310, a tube end receptacle 301 and a seal receiving portion 290. Fluid passageway portion 310 communicates with the attached hose. Tube end receptacle portion 301 positions the end of the inserted tube. Seal receiving portion 290 houses one or more O-ring seals to provide a fluid tight relationship with the inserted rigid tube.

The body further defines a retainer housing section 270 adjacent male member reception end 258. It includes outer annular rim 272 and inner annular rim 274 connected by support members. A generally "U" shaped retainer 350 resides between the rims 272 and 274 and coasts with the male member in a well-known manner to relasably retain a male member within the connector body with the upset on the tube captured against removal by the retainer.

In accordance with the present invention the connector body 250 is provided with an accessory housing generally designated 370 integrally molded to connector body 250. It includes an accessory cavity defining portion 372 and a receptacle portion 374. It is disposed on the hose connection end 260 generally parallel to the longitudinal axis of the through bore 256 defined by wall 254 of body 250. However, the housing 370 could be oriented in any desired relation relative to the length of bore 256.

The cavity defining portion 372 defines an accessory chamber 378 to receive a sensor or other device as discussed in connection with the embodiment of FIGS. 1 to 5. Cavity defining portion includes a bottom wall 380 partially coextensive with the wall 254 of connector body 250. Bottom wall 380 includes a bore or passageway 382 in communication with through bore 256. The sensor chamber 378 is thus in fluid communication with the fluid within the system that includes the quick connector coupling.

Sidewalls 384 extends from bottom wall 380 in a direction away from connector body 250 and define an entrance with a surrounding rim 386.

Receptacle portion 374 of housing 370 includes wall 390 extending from one of the sidewalls 384 of cavity defining portion 372 of housing 370. Wall 390 defines a hollow plug receiving chamber 392.

Electrically conductive prongs or blades 394 are imbedded in the sidewall 384 during the molding process in fluid tight relation and extend into chamber 378. The ends of the prongs 394 are exposed within chamber 378 for contact with the circuitry of a sensor or other device such as sensor 292.

A lug 395 is provided on the exterior of wall 390. It is configured to coast with an insertable plug (not shown) associated with sensor monitoring and data processing devices. The lug 395 relasably retains the plug within hollow plug receiving chamber 392. Suitable contacts within the plug complete the circuit to device 292 through contact with prongs 394.

A cover 396 is relasably positioned on rim 386. Cover 396 is connected in fluid tight relation to rim 386. It is removable for installation of a sensing device within chamber 378 of housing 370.

Cover 396 includes a port 397 that communicates between the surrounding atmosphere and the interior of cavity or chamber 378. It is situated under a protective cap 398. This port or passageway provides access to a reference source of surrounding ambient atmosphere. A sensor 292 can provide a comparative signal based on the difference between the condition sensed in the fluid system and the corresponding parameter in the surrounding atmosphere. As explained in connection with the embodiment of FIGS. 1-5, the port 397 is isolated from the port or passageway 382 by device 292 thus retaining the fluid tight integrity of the fluid of the fluid system within through bore 256 of body 250.

Figure 16:
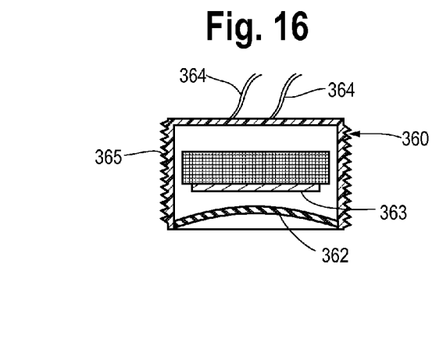
FIG. 16 is a schematic of a variable capacitance sensing device useful with the present invention.

A sensing device 360 illustrated schematically in FIG. 16 is insertable into the accessory housing 170 of the embodiment of FIGS. 1 to 6 or the accessory housing 370 of the embodiment of FIGS. 7 to 12. It is disposed in the chamber 178 or 378 of cavity defining portion 172 or 372. To ensure the fluid tight integrity of the fluid system that incorporates the quick connector, the device 360 is sealed in a leak-proof relationship into the chamber 178 or 378 with an appropriate sealant or potting material, such as previously described in connection with FIGS. 1-5. In this manner, no path exists between the port or passageway 182 or 382 that communicates with the fluid system in the connector and the port 197 or 397 in the cover 196 or 396 that is exposed to the atmosphere.

The sensor 360 illustrated in FIG. 16 is a variable capacitance pressure sensor. It includes a diaphragm 362 exposed to the fluid pressure in the through bore 56 or 256 through passageway 182 or 382. This diaphragm deforms in response to pressure in the system. A second, static plate 363 is embedded in a dielectric material within the device 360. Electrical leads 364 extend from the device to appropriate instrumentation. The deflection of the diaphragm provides a signal and or voltage change in the capacitive characteristics of the device which may then be sent to a measuring instrument for conversion to a readout or to an input to a system monitor. If the second plate is exposed to the atmosphere, a differential pressure reading is provided.

As in the previous embodiment, the sensor 360 is disposed in fluid tight relation to the sidewalls 384 of the accessory chamber 378. The leads 364 may extend from the chamber through the opening defined by rim 386 and it may not be necessary to employ a cover 396.

The sensors 292 or 360 are vapor or liquid fuel pressure sensors. They could be a differential pressure sensor or an absolute pressure sensor. Such sensors are readily available from Delphi World and North American Headquarters, 5725 Delphi Dr., Troy, Mich. 48098; Robert Bosch LLC, 38000 Hills Tech Drive, Farmington Hills, Mich. 48331; or Sensata Technologies, 529 Pleasant St., Attleboro, Mass. 02703. One such sensor is commonly known as an OBDII sensor and is useful in an automotive fuel or vapor system.

Non-powered or non-electrical devices could also be installed into the cavity or chamber 178 or 378 of the accessory housing 170 or 370. Such devices could include a mini-accumulator or pulse damper. Also contemplated for installation are a regulator with third port for return flow if no fuel pressure regulator is provided in the fuel tank, a bleed-off port for heavy-duty applications, such as recreational vehicles that include separate internal combustion engines for power generation, heaters and the like. The connector body with accessory housing could also contain other devices such as tank drains, manual shut-off or diversion valves, and numerous other devices. All of these and numerous other options are made available by the quick connector of the present invention.

Figure 13:
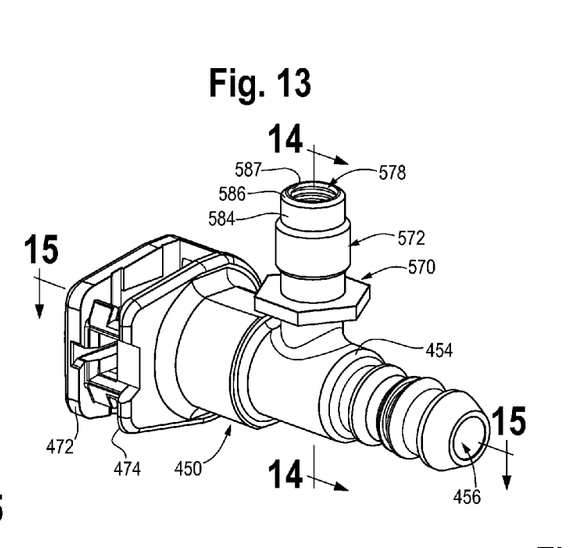
FIG. 13 is a perspective view of another quick connector body embodying the principles of the present invention.
Figure 14:
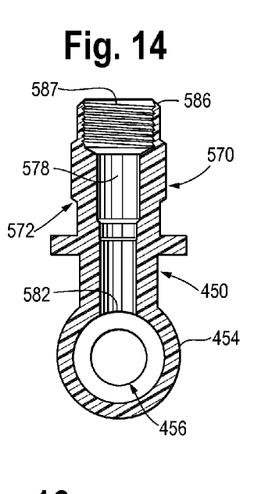
FIG. 14 is a sectional view of the quick connector body of FIG. 14 taken along the line 14-14 of FIG. 13.
Figure 15:
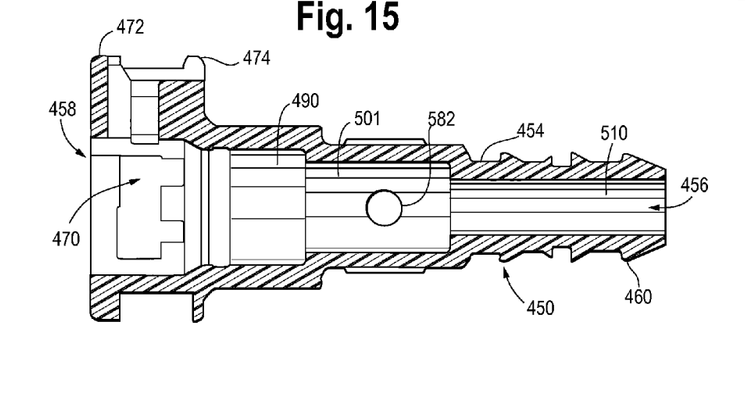
FIG. 15 is a sectional plan view of the quick connector body of FIG. 14 taken along the lines 15-15 of FIG. 13.

Turning now to FIGS. 13-15 there is illustrated a modified form of a connector body 450, embodying the present invention. As in the earlier embodiments, it is a generally cylindrical elongate structure molded of a polymeric material such as nylon-12. It includes a wall 454 defining a through bore 456 that extends from a large diameter male member reception end 458 to a barbed stem or hose connection end 460. The barbs coast with an attached flexible hose in a well-known manner to relasably retain a flexible hose on end 460.

The stem end illustrated is suitable for attachment of a flexible hose to the body 450 of the connector. As in the earlier embodiments, numerous other end configurations are useful, depending on the components employed in the fluid system. For example, the end 460 could be configured to be secured to the non-flexible line or a rigid line with, or without an O-ring seal employed between the end 460 and the attached line. The connection could be secured in a variety of ways, such as by crimping, magna-forming or the like.

Variations in the diameter of the interior bore 456 divide the bore into a fluid passageway portion 510, a tube end receptacle 501 and a seal receiving portion 490. Fluid passageway portion 510 communicates with the attached hose. Tube end receptacle portion 501 positions the end of the inserted tube. Seal receiving portion 490 houses one or more O-ring seals to provide a fluid tight relationship with the inserted rigid tube.

The body further defines a retainer housing section 470 adjacent male member reception end 458. It includes outer annular rim 472 and inner annular rim 474 connected by support members as in the earlier embodiments. A generally "U" shaped retainer resides between the rims 472 and 474 and coasts with the male member in a well-known manner to relasably retain a male member within the connector body with the upset on the tube captured against removal by the retainer.

In accordance with the present invention the connector body 450 is provided with an accessory housing generally designated 570 integrally molded to connector body 450. It includes an accessory cavity defining portion 572. It is disposed generally perpendicular to the longitudinal axis of the through bore 456 defined by cylindrical side wall 454 of body 450.

The cavity defining portion 572 defines an accessory chamber 578 to receive a sensor or other device as discussed in greater detail below. The wall 454 of connector body 450 includes a bore or passageway 582 in communication with through bore 456. The chamber 578 is thus in fluid communication with the fluid within the system that includes the quick connector coupling.

A tubular sidewall 584 extends from connector body 450 and defines an entrance with a surrounding rim 586.

The internal surface of the sidewall 584 is provided with threads 587 to receive a sensor that includes external threads. For example, the sensor 360 of FIG. 16 includes external threads 365. The sensor is secured in the accessory chamber 578 by the threads 587. The threads on wall 584 could alternatively be external threads and the sensor provided with a flange or sleeve with internal threads.

This embodiment eliminates the need for a cover such as cover 196 or 396 and also receptacle portion 174 or 374 of the accessory housing 170 or 370. The sensor in this arrangement is secured to the sidewall 584 in fluid relation to retain the sensor in the chamber 578 and also provide access to system conditions within chamber 578.

The chamber 578 is in communication with the fluid system in through bore 456 through bore 582 thereby providing system conditions within accessory chamber 578. Leads, such as leads 364 connect the sensor 365 to instrumentation that converts the sensed signal to an appropriate read out or monitoring input.

Various features of the present invention have been described with reference to the above illustrative embodiments. It should be understood that modifications may be made without departing from the spirit and scope of the invention.

The invention claimed is:

1. A molded quick connector coupling body having a wall defining a through bore, a first section of said through bore defining a fluid passageway, a second section of said through bore defining a retainer housing section, and a third section of said though bore defining a seal receiving section positioned between said fluid assa ewa and said retainer housing section, and wherein a male member retainer is disposed within said retainer housing section, said body further comprising an integrally molded accessory housing having an accessory receiving chamber defining portion, and a communication passageway extending between said accessory receiving chamber and said fluid passageway.

2. A quick connector coupling body as claimed in claim 1 wherein said accessory receiving chamber defining portion includes a bottom wall defining said communication passageway.

3. A quick connector coupling body as claimed in claim 1 wherein said accessory receiving chamber defining portion includes side walls defining said accessory receiving chamber.

4. A quick connector coupling body as claimed in claim 3 wherein said side walls include a rim defining an opening to said accessory receiving chamber, said accessory housing further including a cover releasably connected to said rim in fluid tight relation.

5. A quick connector coupling body as claimed in claim 4 wherein said cover includes a port communication to the exterior of said accessory receiving chamber.

6. A quick connector body as claimed in claim 5 wherein said cover includes a protective cap overlying said port.

7. A quick connector body as claimed in claim 2 wherein said accessory housing further defines a receptacle portion.

8. A quick connector body as claimed in claim 7 wherein said receptacle portion includes a wall extending from one of said sidewalls of said accessory receiving chamber defining portion defining a hollow plug receiving chamber.

9. A quick connector body as claimed in claim 8 wherein said accessory housing includes at least two electrically conductive prongs in said sidewall between said accessory receiving chamber and said plug receiving chamber with ends of said prongs exposed in said accessory receiving chamber and said hollow plug receiving chamber.

10. A quick connector body as claimed in any one of claims 1 or 2 wherein a sensor is disposed in said accessory receiving chamber.

11. A quick connector body as claimed in any one of claims 3 to 9 wherein a sensor is disposed in said accessory receiving chamber, said sensor is secured in fluid tight relation to said sidewalls.

12. A quick connector body as claimed in claim 11 wherein fluid tight sealant is disposed between said sensor and said sidewalls.

13. A quick connector body as claimed in any one of claims 1 to 9 wherein said body is generally cylindrical and elongate and said accessory housing is disposed generally transverse to said generally cylindrical elongate body.

14. A quick connector body as claimed in any one of claims 1 to 9 wherein said body includes a stem portion opposite to said male member reception end and said stem portion is disposed at 90° to the remainder of said body.

15. A quick connector body as claimed in claim 14 wherein said accessory housing is disposed generally parallel to said stem portion.

16. A quick connector assembly including a quick connector coupling body having a wall defining a through bore a first section of said through bore defining a fluid passway, a second section of said through bore defining a retainer housing section, and a third section of said through bore defining a seal receiving section positioned between said fluid passageway and said retainer housing section. and wherein a male member retainer is disposed within said retainer housing section.

said body thither comprising an integrally molded accessory housing having an accessory receiving chamber defining portion, said accessory receiving chamber defining portion defining a communication passage way in communication with said accessory receiving chamber and said fluid passageway, and a pressure sensing device disposed in said accessory receiving chamber.

17. A quick connector assembly as claimed in claim 16 wherein said accessory receiving chamber defining portion includes at least one side wall defining said accessory chamber, said pressure sensing device is disposed in said accessory chamber in fluid tight relation to said at least one side wall.

18. A quick connector assembly as claimed in claim 17 wherein said at least one sidewall is cylindrical and defines a rim, and said sidewall includes an internal threaded portion.

19. A quick connector assembly as claimed in any one of claims 16 to 18 wherein said pressure sensing device is an absolute pressure sensing device.

20. A quick connector assembly as claimed in any one of claims 16 to 18 wherein said pressure sensing device is a differential pressure sensing device.

21. A quick connector assembly as claimed in any one of claims 16 to 18 wherein said pressure sensing device is a strain gauge pressure sensing device.

22. A quick connector assembly as claimed in any one of claims 16 to 18 wherein said pressure sensing device is a variable capacitance pressure sensing device.

* * * * *

UNITED STATES PATENT AND TRADEMARK OFFICE
CERTIFICATE OF CORRECTION

PATENT NO.        : 7,503,784 B2
APPLICATION NO.   : 11/683250
DATED             : March 17, 2009
INVENTOR(S)       : James Ryan Osborne et al.

It is certified that error appears in the above-identified patent and that said Letters Patent is hereby corrected as shown below:

Column 8
<u>Claim 1</u>:
Line 14, replace "tbrough" with --through--

Line 18, replace "assa ewa" with --passageway--

Column 9
<u>Claim 16</u>:
Line 11, replace "bore" with --bore,--

Line 16, replace "section." with --section,--

Line 17, replace "section." with --section,--

Line 18, replace "thither" with --further--

Signed and Sealed this

Second Day of November, 2010

David J. Kappos
*Director of the United States Patent and Trademark Office*